United States Patent
Kobylinski et al.

(10) Patent No.: US 11,057,568 B2
(45) Date of Patent: Jul. 6, 2021

(54) DEPLOYABLE SIDE SHARK FIN WITH INTEGRATED SIDE VIEW CAMERA AND SENSING DEVICE

(71) Applicant: Inteva Products, LLC, Troy, MI (US)

(72) Inventors: Michael Kobylinski, Roseville, MI (US); Aidano Nascimento, Oakland, MI (US); Brian Staser, Oxford, MI (US); Michael Maddelein, Northville, MI (US); Francois Breynaert, Caen (FR); Luc Benechet, Caen (FR)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 16/580,317

(22) Filed: Sep. 24, 2019

(65) Prior Publication Data

US 2020/0099865 A1    Mar. 26, 2020

Related U.S. Application Data

(60) Provisional application No. 62/736,173, filed on Sep. 25, 2018.

(51) Int. Cl.
| | |
|---|---|
| *B60R 11/04* | (2006.01) |
| *H04N 5/232* | (2006.01) |
| *H04N 5/225* | (2006.01) |
| *G06K 9/00* | (2006.01) |
| *H04N 5/247* | (2006.01) |

(Continued)

(52) U.S. Cl.
CPC .......... *H04N 5/23299* (2018.08); *B60R 1/12* (2013.01); *B60R 11/04* (2013.01); *G06K 9/00798* (2013.01); *H04N 5/2252* (2013.01); *H04N 5/2253* (2013.01); *H04N 5/247* (2013.01); *B60Q 1/32* (2013.01); *B60Q 1/34* (2013.01); *B60R 1/00* (2013.01); *B60R 11/0217* (2013.01); *B60R 11/0247* (2013.01); *B60R 2001/1253* (2013.01); *B60R 2011/004* (2013.01); *B60R 2011/0085* (2013.01); *B60R 2300/8066* (2013.01); *B60S 1/56* (2013.01)

(58) Field of Classification Search
None
See application file for complete search history.

(56) References Cited

U.S. PATENT DOCUMENTS

| | | |
|---|---|---|
| 9,880,382 B1 | 1/2018 | Tippy et al. |
| 2014/0118486 A1 | 5/2014 | Luo et al. |

(Continued)

FOREIGN PATENT DOCUMENTS

| | | |
|---|---|---|
| CN | 206926582 U | 1/2018 |
| DE | 102008038922 A1 | 2/2010 |

(Continued)

OTHER PUBLICATIONS

International Search Report and Written Opinion of PCT/US2019/052660; ISR/RU; dated Jan. 9, 2020; 8 pages.

*Primary Examiner* — Christopher G Findley
(74) *Attorney, Agent, or Firm* — Cantor Colburn LLP

(57) ABSTRACT

A multi-view imaging system for a vehicle includes a housing fixedly secured external to the vehicle and an extendable camera configured to image a side and/or rear from the vehicle and to extend from and retract into the housing. The multi-view imaging system further includes an actuator configured to urge the extendable camera out of and into the housing.

20 Claims, 7 Drawing Sheets

(51) Int. Cl.
  *B60R 1/12* (2006.01)
  *B60R 11/00* (2006.01)
  *B60Q 1/32* (2006.01)
  *B60Q 1/34* (2006.01)
  *B60R 11/02* (2006.01)
  *B60S 1/56* (2006.01)
  *B60R 1/00* (2006.01)

(56) References Cited

U.S. PATENT DOCUMENTS

| | | | |
|---|---|---|---|
| 2014/0376119 A1 | 12/2014 | Sobecki et al. | |
| 2016/0243988 A1* | 8/2016 | Peterson | G06K 9/00805 |
| 2017/0080863 A1 | 3/2017 | Henion et al. | |
| 2017/0210351 A1 | 7/2017 | Ghannam et al. | |
| 2017/0297540 A1 | 10/2017 | Zhang et al. | |
| 2017/0341595 A1* | 11/2017 | Thompson | B60R 11/04 |
| 2019/0039531 A1* | 2/2019 | Wilson | B60S 1/0818 |
| 2019/0118728 A1* | 4/2019 | Oba | H04N 5/247 |

FOREIGN PATENT DOCUMENTS

| | | | |
|---|---|---|---|
| GB | 2255539 A | 11/1992 |
| JP | 2005136561 A | 5/2005 |
| JP | 2009116723 A | 5/2009 |
| KR | 20010091415 A | 10/2001 |
| WO | 2017191033 A1 | 11/2017 |

* cited by examiner

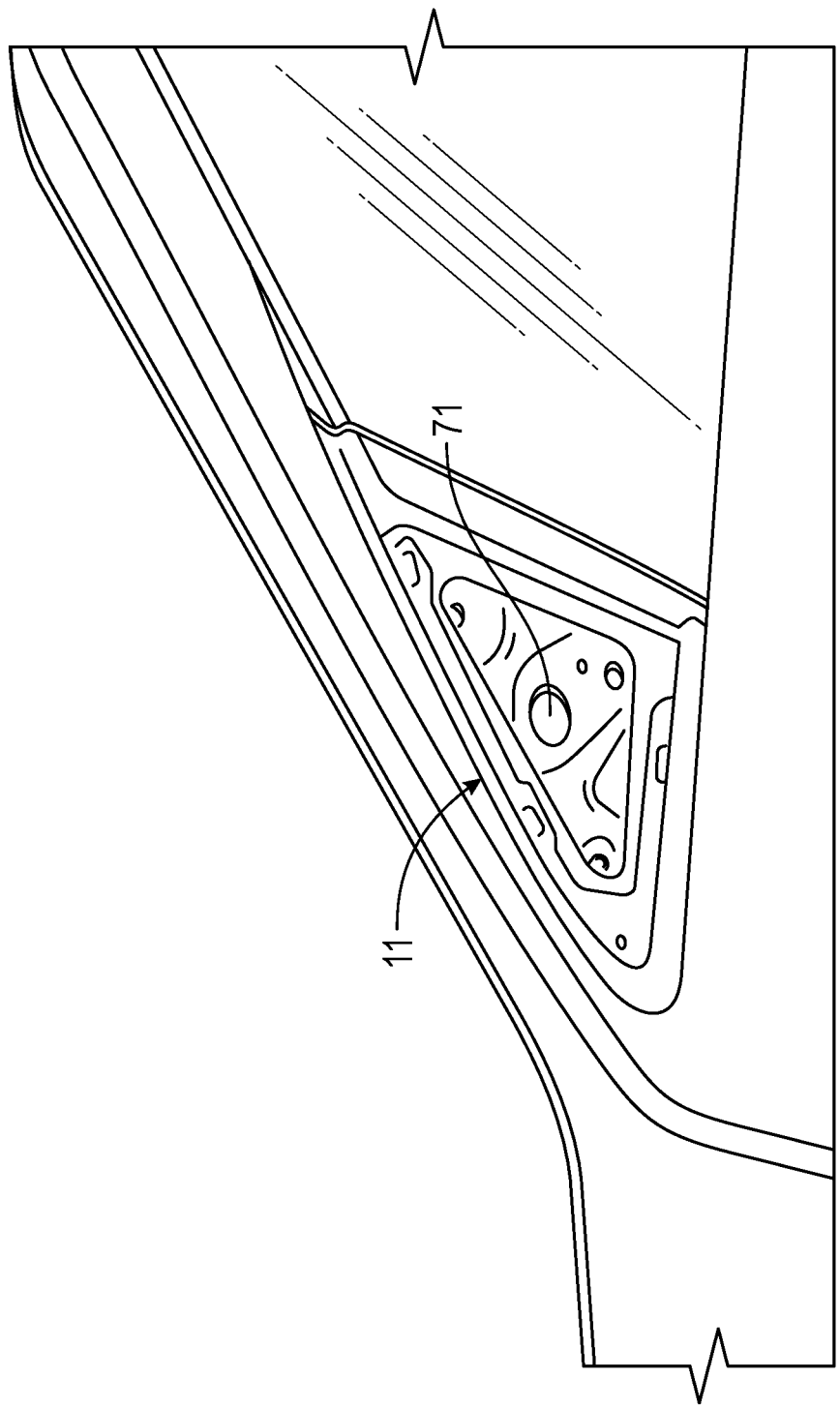

DEPLOYABLE SIDE SHARK FIN WITH INTEGRATED SIDE VIEW CAMERA AND SENSING DEVICE

CROSS REFERENCE TO RELATED APPLICATION

This application claims the benefit of an earlier filing date from U.S. Provisional Application Ser. No. 62/736,173 filed Sep. 25, 2018, the entire disclosure of which is incorporated herein by reference.

BACKGROUND

Exemplary embodiments pertain to the art of vehicles, and more particularly to rear view imaging systems for vehicles.

Conventional vehicles typically have large external mirrors mounted at, for example an outer door panel of the vehicle. The external mirrors allow the vehicle operator to view the portions of the vehicle surroundings, such as those areas beside the vehicle and/or behind the vehicle operator. The external mirrors, however, have disadvantages. The external mirrors are often heavy, reduce aerodynamic efficiency of the vehicle, and obscure the view behind the mirrors. Furthermore, mirrors have a weakness in that rain, snow and poor lighting can significantly degrade images and create potential safety concerns. Hence, it would be well received by the automotive industries if multi-view imaging systems were developed that addressed these disadvantages.

BRIEF DESCRIPTION

A multi-view imaging system for a vehicle is provided. The multi-view imaging system includes: a housing fixedly secured external to the vehicle; an extendable camera configured to image a side and/or rear view from the vehicle and to extend from and retract into the housing; and an actuator configured to urge the extendable camera out of and into the housing.

In addition to one or more of the features described above, or as an alternative, further embodiments of the multi-view imaging system may include wherein the housing is disposed in a generally triangular area forward of a window in a door.

In addition to one or more of the features described above, or as an alternative, further embodiments of the multi-view imaging system may include a controller configured to control the actuator in response to receiving at least one of a manual input and an automatic input.

In addition to one or more of the features described above, or as an alternative, further embodiments of the multi-view imaging system may include wherein the automatic input is in response to the vehicle being in a running or ready to run condition.

In addition to one or more of the features described above, or as an alternative, further embodiments of the multi-view imaging system may include a microphone.

In addition to one or more of the features described above, or as an alternative, further embodiments of the multi-view imaging system may include a speaker.

In addition to one or more of the features described above, or as an alternative, further embodiments of the multi-view imaging system may include a projector configured to project an image downward.

In addition to one or more of the features described above, or as an alternative, further embodiments of the multi-view imaging system may include a rear facing mirrored surface disposed on the housing.

In addition to one or more of the features described above, or as an alternative, further embodiments of the multi-view imaging system may include a light source aimed downward.

In addition to one or more of the features described above, or as an alternative, further embodiments of the multi-view imaging system may include a radar unit configured to sense an object adjacent to the vehicle.

In addition to one or more of the features described above, or as an alternative, further embodiments of the multi-view imaging system may include a Lidar unit configured to sense an object adjacent to the vehicle.

In addition to one or more of the features described above, or as an alternative, further embodiments of the multi-view imaging system may include a turn-signal light.

In addition to one or more of the features described above, or as an alternative, further embodiments of the multi-view imaging system may include wherein the actuator is configured to extend the extendable camera a first distance for the vehicle not towing a trailer and to extend the extendable camera a second distance greater than the first distance for the vehicle towing a trailer.

In addition to one or more of the features described above, or as an alternative, further embodiments of the multi-view imaging system may include wherein the actuator is configured to extend the extendable camera a variable distance.

In addition to one or more of the features described above, or as an alternative, further embodiments of the multi-view imaging system may include wherein the extendable camera is configured to rotate up and down in order to raise and lower a view to the rear of the vehicle in response to at least one of a manual and an automatic control input.

In addition to one or more of the features described above, or as an alternative, further embodiments of the multi-view imaging system may include a wiper configured to wipe clean a lens of the extendable camera each time the extendable camera is extended or retracted.

In addition to one or more of the features described above, or as an alternative, further embodiments of the multi-view imaging system may include a sensor configured to detect a lane.

In addition to one or more of the features described above, or as an alternative, further embodiments of the multi-view imaging system may include a forward viewing camera.

In addition to one or more of the features described above, or as an alternative, further embodiments of the multi-view imaging system may include a controller configured to manage opening and/or closing of a handle-less door of a vehicle automatically under power release remotely and/or directly via a user operated switch.

BRIEF DESCRIPTION OF THE DRAWINGS

The following descriptions should not be considered limiting in any way. With reference to the accompanying drawings, like elements are numbered alike:

FIG. 10 depicts aspects of the shark fin area having an opening.

DETAILED DESCRIPTION

A detailed description of one or more embodiments of the disclosed apparatus and method are presented herein by way of exemplification and not limitation with reference to the Figures.

Figure 1:
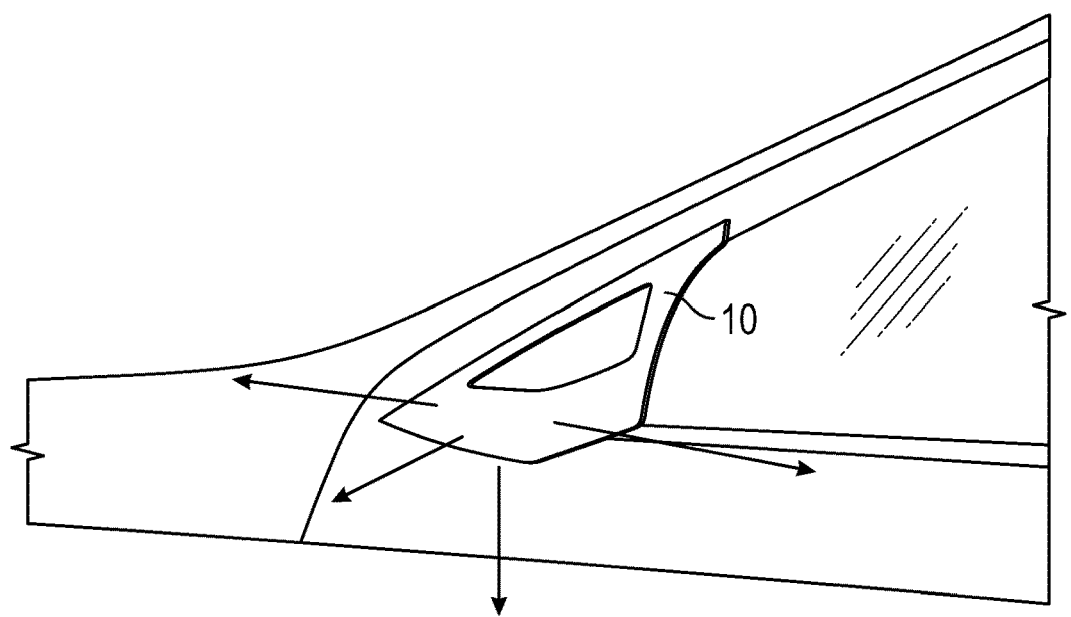
FIG. 1 illustrates a multi-view imaging system having multiple directions of view.
Figure 2:
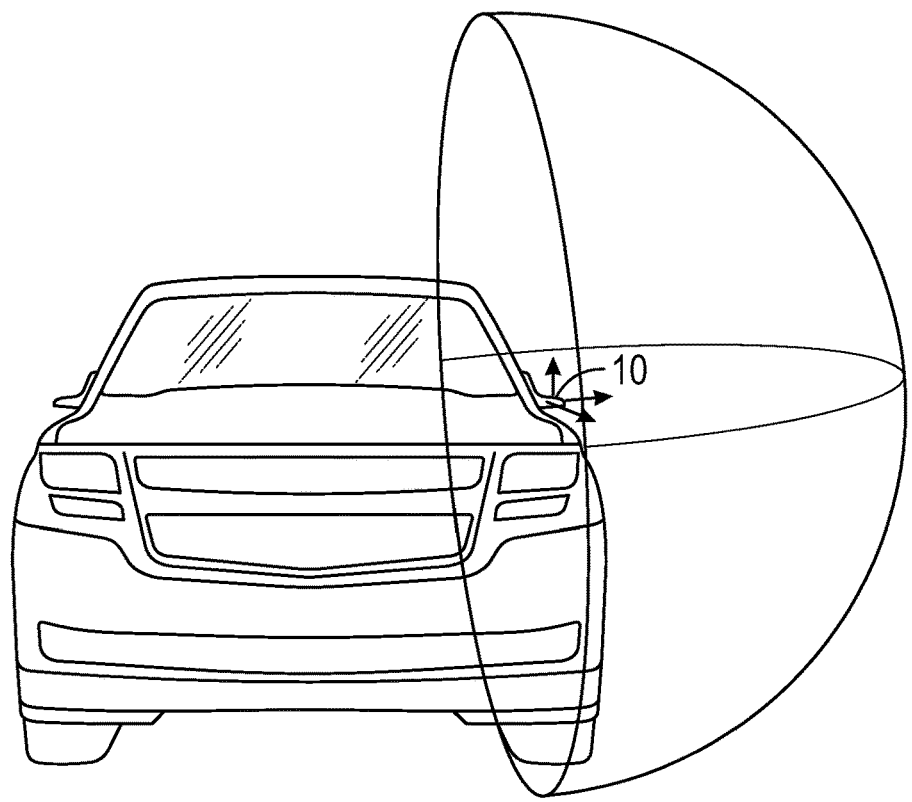
FIG. 2 depicts aspects multiple directions of view in an embodiment of the multi-view imaging system.

Disclosed is a multi-view imaging system that addresses the disadvantages of conventional mirrors discussed above. The term "multi-view" is intended to mean multiple directions of view because the multi-view imaging system may image views to the side, rear and/or front of a vehicle using the multi-view imaging system. In one or more embodiments, the multi-view imaging system uses a wide angle lens (e.g., about 70° in a non-limiting embodiment) that images a view to the rear and side of the vehicle. In one or more embodiments, the imaged side view includes what would be a blind spot for a vehicle with a rear view mirror. In one or more embodiments, the multi-view imaging system includes a side-looking radar unit that generally has a 180° field of view to detect objects behind, to the side, and forward of the vehicle and the ability to penetrate rain, snow and darkness, thereby creating a better safety solution. FIG. 1 illustrates a multi-view imaging system 10 having multiple directions of view depicted by the arrows. FIG. 2 depicts aspects of multiple directions of view in an embodiment of the multi-view imaging system 10. In the embodiment of FIG. 2, the multi-view imaging system 10 has a hemispherical imaging view. In one or more embodiments, the multi-view imaging system is inclusive of a near field sensor, ultrasonic sensor, and/or an ultra wide-band sensor for use with sensing pedestrians, objects, or other items that a car door may interfere with during opening and closing. All sensors may work together or separately to ensure the system that can detect when the door will hit something, and then be able to stop it through software programming in a door control unit, door control module, body control module, or other system control in the car.

Figure 3:
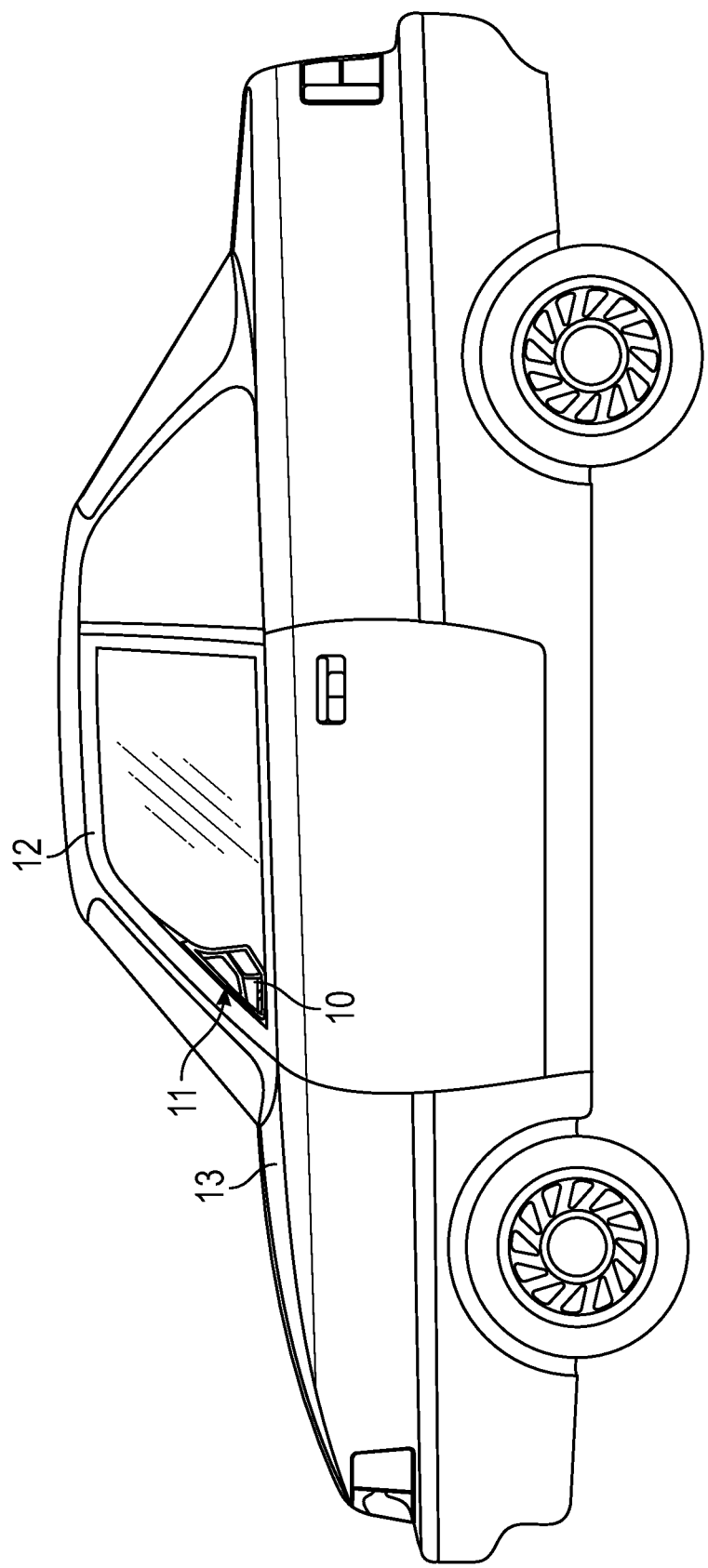
FIG. 3 is a side view of a door of a vehicle having a multi-view imaging system disposed in a shark fin area of the door.

Referring now to FIG. 3, illustrated is an embodiment of the multi-view imaging system 10 disposed on an area 11, which may be referred to herein as a shark fin area 11, of a door 12 of a vehicle 13. In one or more embodiments, the door 12 opens to a front seating area of an automobile. The shark fin area 11 is that generally triangular area forward of the door window. Alternatively, the multi-view imaging system 10 may be secured directly to door sheet metal. While the multi-view imaging system 10 is illustrated as being on the left side of the vehicle 13, the imaging system 10 may also be disposed on the right side.

Figure 4:
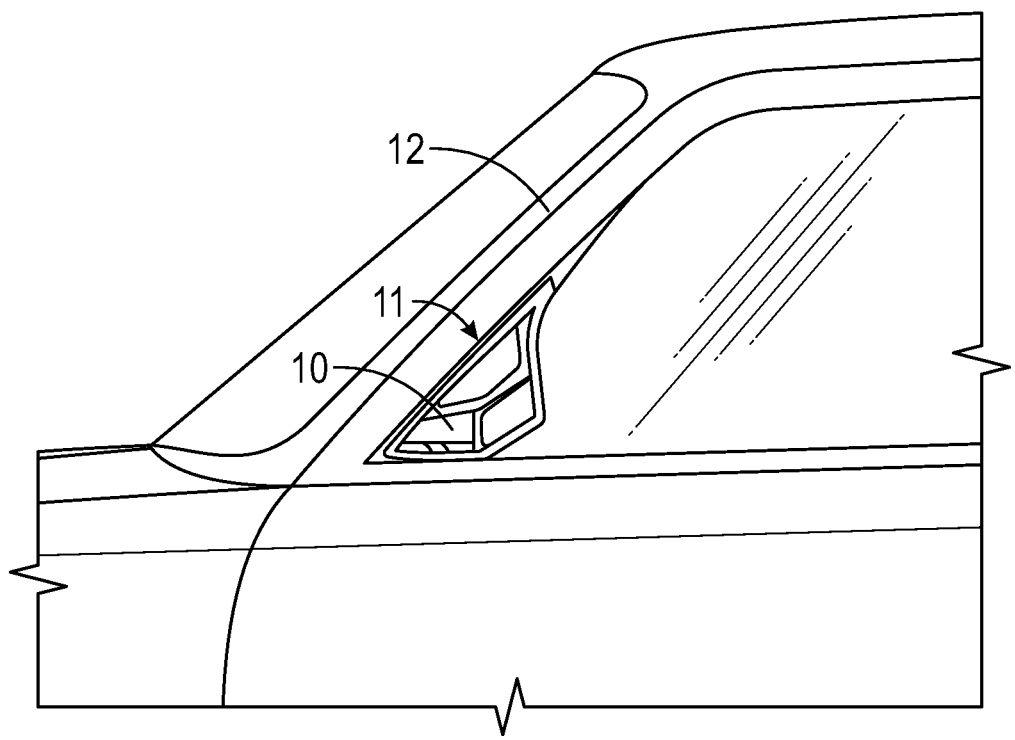
FIG. 4 is a three-dimensional view of the multi-view imaging system.

FIG. 4 provides a closer view of the multi-view imaging system 10 disposed on the shark fin area 11 in three-dimensions. The cross-sectional area of the multi-view imaging system 10 facing forward is generally less than the corresponding cross-sectional area of conventional rear view mirrors thereby presenting less aerodynamic drag. In addition, the smaller cross-sectional area provides for increased forward visibility.

Figure 5:
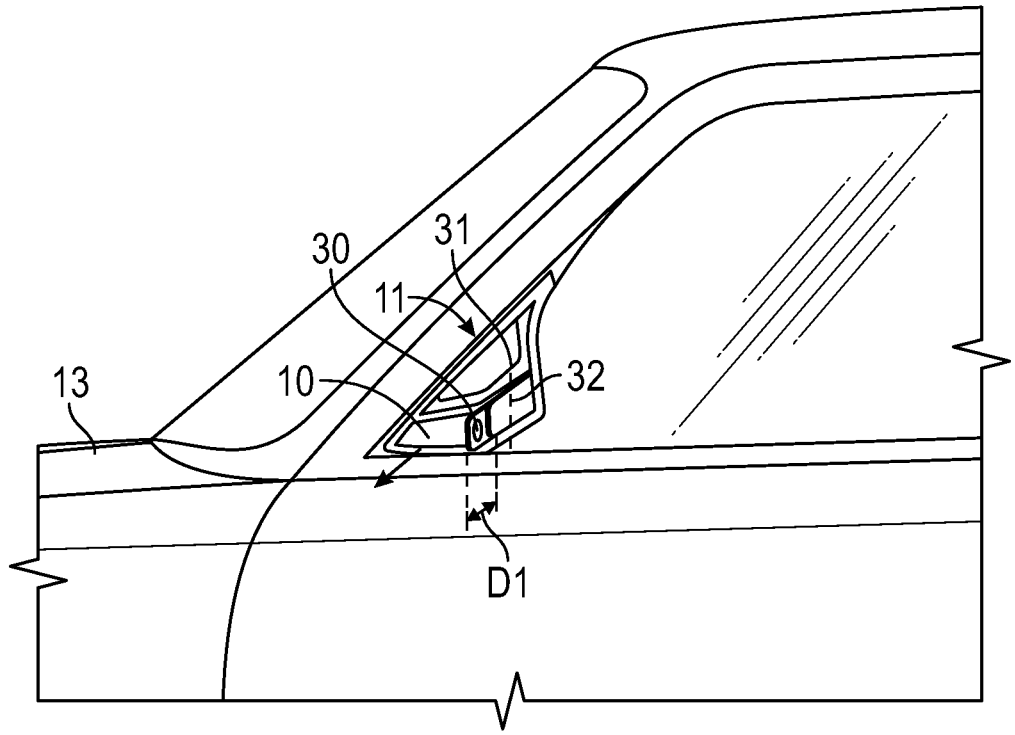
FIG. 5 is a three-dimensional view of the multi-view imaging system depicting aspects of an extendable camera.
Figure 6:
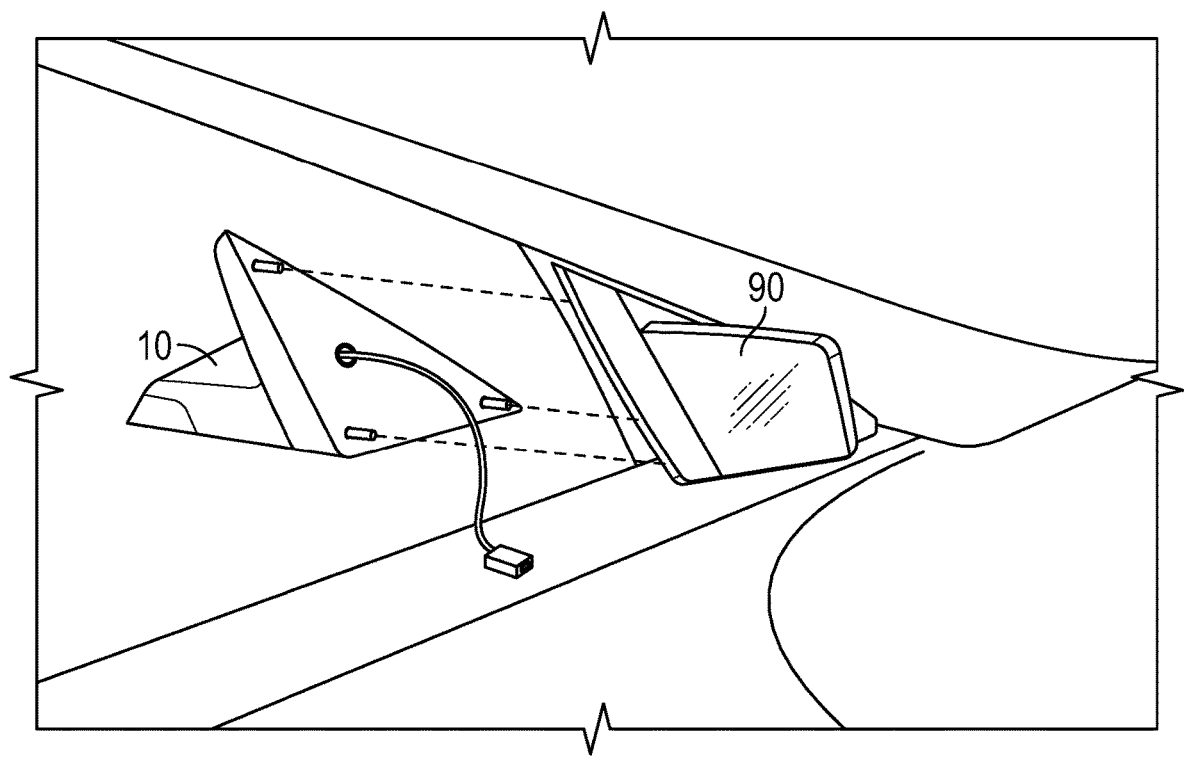
FIG. 6 depicts aspects of an interior display disposed on an interior portion of the shark fin area.

FIG. 5 is a three-dimensional view of the multi-view imaging system 10 depicting aspects of a camera 30, which may be referred to herein as an extendable camera 30. The extendable camera 30 is configured to extend a distance D1 from a housing 31. In one or more embodiments, the housing 31 is fixedly secured external to the vehicle 13. That is, the housing 31 is fixed (i.e., does not extend) with respect to the vehicle or door of the vehicle. An image obtained by the camera 30 can be displayed to a driver using a display such as a display disposed anywhere inside the vehicle. In one or more embodiments, a display 90 inside the vehicle is part of the multi-view imaging system 10 placed on an inside face of the shark fin area 11 as illustrated in FIG. 6.

The multi-view imaging system 10 is configured to retract the camera 10 into the housing 31 when the vehicle 13 is not running or parked in order to protect the camera 30 from damage. Conversely, the multi-view imaging system 10 is configured to extend the camera 30 when the vehicle is started or running. In general, the viewing angle provided by the camera 30 is the same as or wider than the viewing angle that would be provided by a conventional rear view mirror. The multi-view imaging system 10 may be configured to rotate the camera 30 about an axis extending from the side of the door in order to raise or lower the view imaged by the camera 30. In one or more embodiments, the rotation is controlled by the driver to provide a desired view. Alternatively, the camera view may be fixed. In this embodiment, the driver may manipulate the image on the view screen to focus on desired areas within the cameras viewing area, zoom, pan, etc. The multi-view imaging system 10 may include a wiper 32 configured to wipe a lens of the camera 30 every time the camera 30 is extended or retracted. This feature provides for keeping the lens clean and providing a clear image. Furthermore, the camera 30 may include a heating element to prevent snow and/or ice from building up on a lens of the camera 30.

Figure 7:
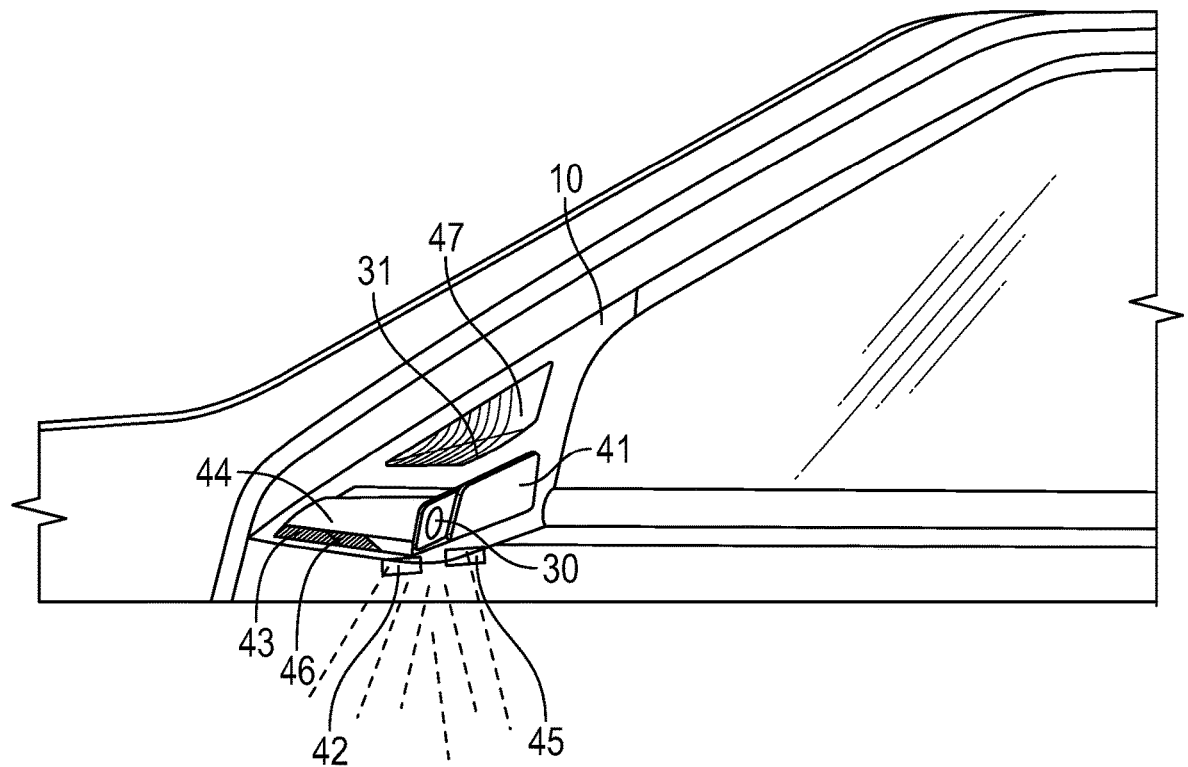
FIG. 7 is a three-dimensional view of the multi-view imaging system depicting other aspects of the multi-view imaging system.

FIG. 7 depicts other aspects of the multi-view imaging system 10. The multi-view imaging system 10 may include a backup mirror 41 disposed on the housing 31 to provide multi-view sight capability should a problem develop with the multi-view imaging system 10. The multi-view imaging system 10 may include LED lights 42 aimed downward. The LED lights 42 may be configured to turn on when the corresponding door is opened, or a key/smart-key is approaching the vehicle, or the vehicle unlocking is remotely controlled in order to illuminate the ground when a driver or passenger is getting into or leaving the vehicle 13. The multi-view imaging system 10 may include a turn signal light 43 that is configured to blink in unison with the other turn signal lights on the vehicle 13. The multi-view imaging system 10 may include a radar and/or Lidar unit 44 configured to detect other vehicles or obstructions adjacent to the vehicle 13. The radar and/or Lidar unit 44 is configured to provide the driver with a warning signal (visual and/or audible) upon detecting an obstruction (e.g., blind spot detection) under certain circumstances such as when a turn signal is activated. Furthermore, the radar and/or Lidar unit 44 looking to the side can detect an impending side collision early, thereby, deploying a side airbag system early to better protect any passengers on that side of the vehicle.

The multi-view imaging system 10 may include an image projector 45 configured to display custom messages on the ground next to the vehicle 13. For example, the image projector 45 may project the word "HELP" if the vehicle 13 is disabled. As another example, the image projector 45 may project an image (e.g., a pet or flowers) selected by a user. The multi-view imaging system 10 may include a microphone 46 and/or a speaker 47. The microphone 46 may be connected to a speaker inside a cabin of the vehicle 13 and/or the speaker 47 may be connected to a microphone inside the cabin. This way, the driver or passenger can conduct a conversation with someone outside the vehicle 13 without opening a window for safety, security, or weather concerns. In one or more embodiments, the microphone 46 can provide input to a vehicle processing system having voice detection for receiving commands, such as "open the door," from a user. An advantage of having the housing 31 fixedly secured external to the vehicle is that it provides a support structure to which the above described features, such as the backup mirror 41, can be attached.

Figure 8:
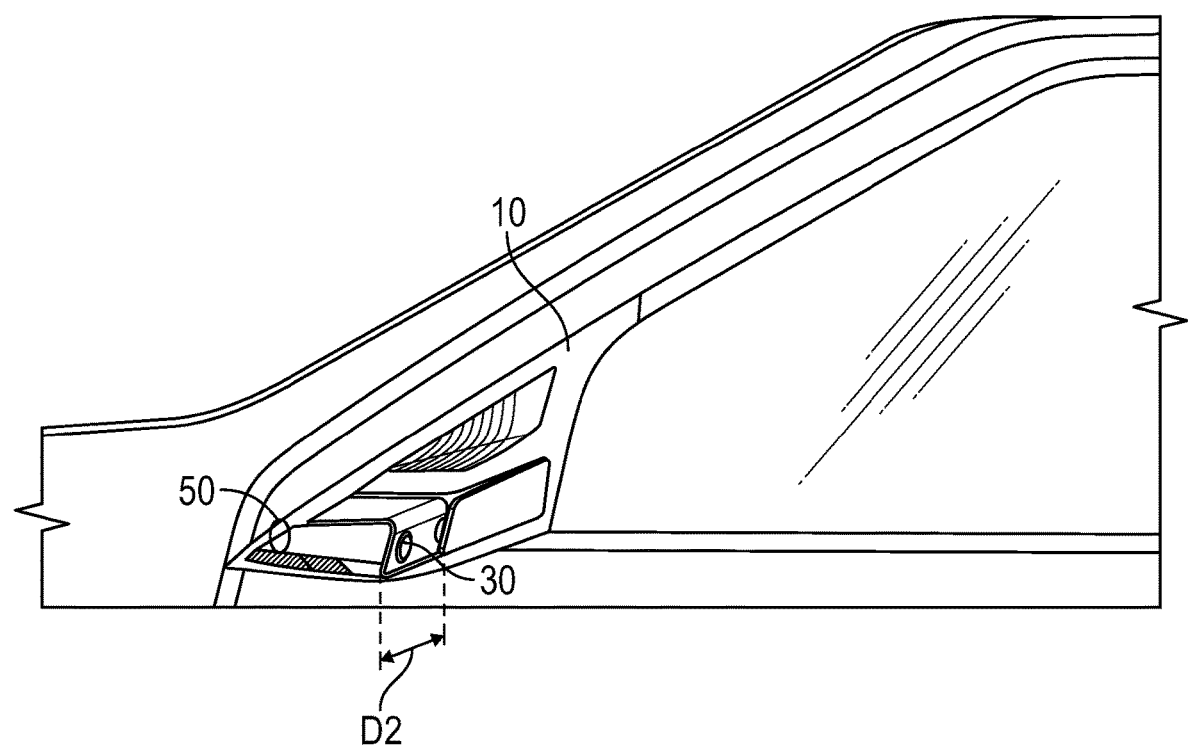
FIG. 8 is a three-dimensional view of the multi-view imaging system depicting aspects of further extending the extendable camera for trailer towing.

It can be appreciated that the multi-view imaging system 10 may be configured to further extend the extendable camera 30 a distance D2 greater than the distance D1, as illustrated in FIG. 8, for trailer towing purposes. The further extended distance D2 enables the camera 30 to image an area behind a trailer.

It can be appreciated that the multi-view imaging system 10 may also include a forward view imaging camera 50 as illustrated in FIG. 8. In one or more embodiments, the forward view imaging camera 50 may be configured as a night-vision camera to provide the driver with enhanced night-vision images. In one or more embodiments, the forward view imaging camera 50 may be configured to provide input to a processing system for detecting lane departure and providing a corresponding warning.

Figure 9:
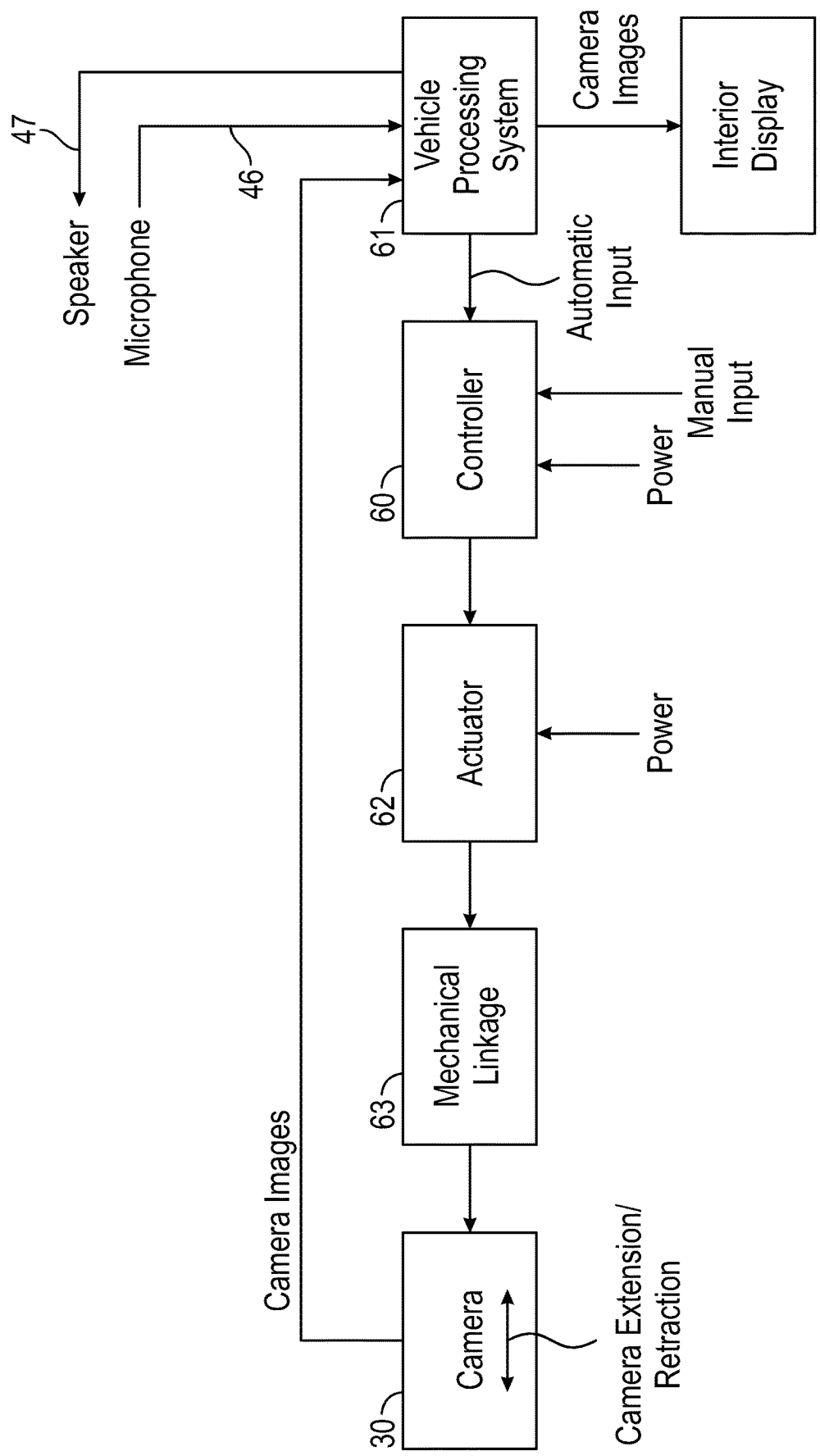
FIG. 9 is a schematic diagram depicting aspects of operation and control of the multi-view imaging system.

FIG. 9 is a schematic diagram depicting aspects of operation and control of the multi-view imaging system 10. A controller 60 is configured to control one or more aspects of the multi-view imaging system 10. The controller 60 may include digital and/or analog components and may be a separate unit or may be incorporated into a vehicle processing system 61 as one or more functions of that processing system. The digital components may include a processor, memory, and communication interface (hardwired or wireless). The processor may be configured to execute instructions stored in the memory for control and operation of the various features disclosed herein. The communication interface may provide for communication of data between the controller and the vehicle processing system. Certain areas imaged by the multi-view imaging system can be specifically analyzed when activating vehicle functionalities. For example, the vehicle upper lateral portion can be specifically analyzed for identifying any risk of trapping an object or body when closing a power window regulator. Another vehicle lateral portion can be analyzed if opening a door, manually or by an actuator, to prevent it from hitting obstacles or bodies. Defining limited pixel numbers of the captured image to be analyzed requires less processor resource. The advantage of using images of the multi-view imaging system disposed on a door is that it is moving with the door and no dynamic pixel area adjustment is necessary, once the area to be analyzed is defined, it remains the same pixel range.

An actuator 62 controlled by the controller 60 may be configured to extend and retract the extendable camera 30 using a mechanical linkage 63. In one or more embodiments, the actuator 62 is an electric motor. In one or more embodiments, the mechanical linkage 63 includes a screw-drive mechanism turned by the actuator 62. In an alternative embodiment, the mechanical linkage 63 includes a vertical axis or axel about which the camera 30 rotates to extend the camera 30 from the housing 31. In one or more embodiments, movement of the extendable camera 30 may be guided by rails. In one or more embodiments, the mechanical linkage 63 includes a horizontal axis or axel about which the camera 30 rotates up or down in order to raise or lower the view imaged by the camera 30.

Power for components of the multi-view imaging system 10 may be provided by an electrical system of the vehicle 13. In one or more embodiments, the controller 60 and the actuator 62 receive electric power from the electrical system. Images provided by the camera 30 may be transmitted to the vehicle processing system 61 which can then display them on a driver display. The vehicle processing system 61 may also be configured to process data in support of the other features of the multi-view imaging system 10 as discussed above and to provide automatic input to the controller 60.

The multi-view imaging system 10 has many advantages. Some of the advantages of locating the multi-view imaging system 10 to the shark fin area 11 are: 1) a driver would be comfortable with this location and the images the camera produces because the driver would be used to looking at images from a rear view mirror in this location, 2) there is an existing hole in that area from supporting the outside mirror that can be easily adapted to supporting the multi-view imaging system with a wire harness and 3) this is a very good location to add a wide angle camera lens to detect blind spot obstacles. In addition, wiring harness routing would not require a new hole in the door because the wiring harness could be routed through an existing opening 71 in shark fin area 11 as illustrated in FIG. 10. Yet another advantage is that the multi-view imaging system 10 can be used with a handle-less door to manage the opening and closing of the door automatically under power release, remote, or directly controlled through an outside switch, which may take many forms, without having interference with any objects, and also to help sense the angle of the car to determine the opening/closing weight of the door. Yet another advantage is the multi-view imaging system 10 can manage door openings and closings at the same time it can detect obstacles.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates to one or more structural limitations of a device that are required for the device to perform the function or operation for which the device is configured.

The disclosure illustratively disclosed herein may be practiced in the absence of any element which is not specifically disclosed herein.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodi-

What is claimed is:

1. A multi-view imaging system for a vehicle, comprising:
a housing fixedly secured external to the vehicle;
an extendable camera configured to image a side and/or rear view from the vehicle and to extend from and retract into the housing; and
an actuator configured to urge the extendable camera out of and into the housing;
wherein the actuator is configured to extend the extendable camera a first distance for the vehicle not towing a trailer and to extend the extendable camera a second distance greater than the first distance for the vehicle towing a trailer.

2. The multi-view imaging system of claim 1, wherein the housing is disposed on a door in a generally triangular area forward of a window in the door.

3. The multi-view imaging system of claim 2, further comprising a controller configured to control the actuator in response to receiving at least one of a manual input and an automatic input.

4. The multi-view imaging system of claim 3, wherein the automatic input is in response to the vehicle being in a running or ready to run condition.

5. The multi-view imaging system of claim 1, further comprising a microphone.

6. The multi-view imaging system of claim 1, further comprising a speaker.

7. The multi-view imaging system of claim 1, further comprising a projector configured to project an image downward.

8. The multi-view imaging system of claim 1, further comprising a rear facing mirrored surface disposed on the housing.

9. The multi-view imaging system of claim 1, further comprising a light source aimed downward.

10. The multi-view imaging system of claim 1, further comprising a radar unit configured to sense an object adjacent to the vehicle.

11. The multi-view imaging system of claim 1, further comprising a Lidar unit configured to sense an object adjacent to the vehicle.

12. The multi-view imaging system of claim 1, further comprising a turn-signal light.

13. The multi-view imaging system of claim 1, wherein the actuator is configured to extend the extendable camera a variable distance.

14. The multi-view imaging system of claim 1, wherein the extendable camera is configured to rotate up and down in order to raise and lower a view to the rear of the vehicle in response to at least one of a manual and an automatic control input.

15. The multi-view imaging system of claim 1, further comprising a wiper configured to wipe clean a lens of the extendable camera each time the extendable camera is extended or retracted.

16. The multi-view imaging system of claim 1, further comprising a sensor configured to detect a lane.

17. The multi-view imaging system of claim 1, further comprising a forward viewing camera.

18. A multi-view imaging system for a vehicle, comprising:
a housing fixedly secured external to the vehicle;
an extendable camera configured to image a side and/or rear view from the vehicle and to extend from and retract into the housing; and
an actuator configured to urge the extendable camera out of and into the housing; and
a controller configured to manage opening and/or closing of a handle-less door of a vehicle automatically under power release remotely and/or directly via a user operated switch.

19. The multi-view imaging system of claim 18, wherein the housing is disposed on a door in a generally triangular area forward of a window in the door.

20. The multi-view imaging system of claim 18, further comprising a controller configured to control the actuator in response to receiving at least one of a manual input and an automatic input, wherein the automatic input is in response to the vehicle being in a running or ready to run condition.

* * * * *